United States Patent Office 3,660,518
Patented May 2, 1972

3,660,518
PROCESS UTILIZING π BASE AROMATIC MODIFIED CATALYST FOR WAX PRODUCTION
Neville L. Cull, Baker, and Roby Bearden, Jr., and Joseph K. Mertzweiller, Baton Rouge, La., assignors to Esso Research and Engineering Company
No Drawing. Filed Dec. 5, 1968, Ser. No. 781,614
Int. Cl. C07c 3/10
U.S. Cl. 260—683.15 D
12 Claims

ABSTRACT OF THE DISCLOSURE

An ethylene growth process for obtaining reaction product mixtures rich in linear $C_{22}$ to $C_{200}$ wax range olefins, especially linear alpha olefins of the $C_{40}$ to $C_{100}$ carbon number range. An ethylene oligomerization reaction is conducted in a diluent in the presence of an oligmerization catalytic mixture consisting of a transition metal halide and an organoaluminum halide, previously modified by treatment with a pi base compound, particularly a pi base aromatic compound, to yield said wax range without substantial production of high molecular weight polymers. Pressures and temperatures are selected to maintain a molar ratio of ethylene to product olefins sufficient to minimize copolymerizable of the product olefins.

---

Naturally occurring specialty waxes of which the microcrystalline waxes are representative are greatly valued for their hardness, luster and high melting points which range, e.g., from about 170° F. to 250° F. These waxes, used primarily as additive waxes to bolster the properties of the lower melting paraffin waxes, enjoy a large and growing market. However, it is doubtful that the current sources of these specialty waxes, i.e., crude oil stocks, are completely adequate and will thus put the microcrystalline waxes in short supply.

This same situation exists, perhaps to an even larger dgeree, for the naturally occurring animal and vegetable waxes, e.g., beeswax and Carnauba wax, which are widely used in polishing wax formulations. These waxes differ primarily from the microcrystalline or mineral waxes in that they contain functional groups, e.g., hydroxyl or carboxylic acid groups. The need for synthetic mineral, animal and vegetable waxes is clearly indicated.

It was recognized that some oligomers of linear alpha olefins have properties which make them quite desirable as waxes. The polymerization of ethylene to linear alpha olefins in the $C_{22}$–$C_{200}$ range would, it was recognized, provide an excellent source of high melting mineral waxes. Moreover, these olefin waxes would be ideal raw materials for the synthesis of the functionally substituted animal and vegetable waxes. The feasibility of a process based on polymerization of ethylene for producing such olefins, however, was in doubt.

Traditionally, ethylene is polymerized at selective conditions in the presence of catalytic complexes formed from mixtures consisting of transition metal halide, aluminum halides and organoaluminum compounds to yield various products. High molecular weight, high density polymers are formed in the presence of these insoluble Ziegler type catalyst complexes produced, e.g., by reaction between titanium tetrachloride, aluminum chloride, and aluminum triethyl. A characteristic of such reactions is that in the formation of the resultant insoluble catalytic complex the titanium metal is reduced to a metal having a valence of three or below.

Oligomers, which have entirely different properties due, in part, to the very limited molecular weight, have also been prepared. The catalyst complexes used for conducting oligomerization reactions are an entirely different complex and the reaction apparently proceeds by a different mechanism. For example, whereas average product molecular weight varies inversely with temperature in the reduced titanium system, molecular weight varies directly with temperature for the soluble oligomerization catalyst. The reactants used in the formation of these oligomerization catalyst complexes include transition metal halides and also organoaluminum halide compounds, added together in specified concentrations, to produce a soluble complex wherein the titanium metal of the complex is unreduced.

Acidic metal halides and organo metal halides (e.g., $FeCl_3$, $AlBr_3$, $SnCl_4$, $SnEtCl_3$) may also be included in the catalyst formulation to improve activity and stability, particularly when the catalyst is used in nonpolar solvents. Reference is made to our copending application Ser. No. 804,006, filed Mar. 3, 1969, on the use of acidic metal halide modified ethylene oligomerization catalysts. It is thought that $TiCl_4$ reacts with $AlEt_2Cl$ to produce a highly polarized soluble covalent complex or perhaps an ion pair wherein the titanium metal is unreduced, or has a 4+ valence in accordance with the following simplified formulae:

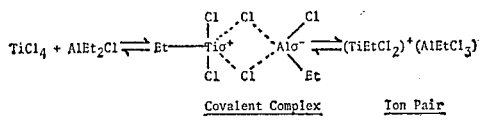

Covalent Complex     Ion Pair

In the formula, Et represents the ethyl group. The $\sigma^+$ and $\sigma^-$ signs represent, respectively, the centers of low and high electron density in the complex. In the ion pair representation, the $\sigma$ signs (indicating partial development) are omitted to indicate a more fully developed ionic character.

In forming such oligomerization catalysts, the reactants are premixed in the polymerization diluent at conditions selected to optimize oligomerization catalyst formation, while inhibitng formaton of the insoluble Ziegler type catalysts. When ethylene is added to a solution of the oligomerization catalytic complex, at appropriate conditions, $C_4$ to $C_{60}$ oligomers, particularly the $C_4$ to $C_{22}$ oligomers, and especially Type I or linear alpha loefihs, are selectively formed in very high concentrations to the exclusion of high molecular weight polymers, Type II ($RCH=CHR$), Type III ($R_2C=CH_2$), and Type IV ($R_2C=CHR$) olefins.

The carbon number range attainable with these oligomerization catalyst systems, however, is limited, and the desired $C_{22}$–$C_{200}$ wax range olefins are formed only in moderate amounts even under the most favorable conditions, viz, as when oligomerization is conducted in nonpolar diluents at relatively high temperatures. Unfortunately, as conditions are adjusted to favor formation of the desired oligomers, increasing yields of the undesirable high molecular weight polyethylene are encountered. Such phenomenon has militated against an ethylene oligomerization process for production of wax range olefins.

It is nonetheless the primary objective of the present invention to obviate these and other difficulties and, particuarly, to provide a new and improved ethylene oligomerization process for the highly selective formation of reaction product mixtures containing high concentrations of $C_{22}$ to $C_{200}$ linear alpha olefins, especially $C_{40}$ to $C_{100}$ linear alpha olefins.

These and other objects are achieved in accordance with the present invention which is based on the discovery that pi (π) base compounds can be used to modify the soluble oligomerization catalyst complexes formed from mixtures of unreduced transition metal halides and organoaluminum halides. The π base compound, or mixture thereof, is added or incorporated within the catalytic mixtures prior to initiation of the ethylene oligomerization reaction in relatively small, critical concentrations, sufficient to alter, to some extent, the character of the soluble complex. The change in the catalyst is manifested primarily by an increase in the number average molecular weight of the product olefins when used in nonpolar diluents such as heptane, and by an increase in catalyst stability when used in polar diluents such as xylene.

In preparation of the catalyst, the modifier, or π base compound, in suitable concentration is added to or incorporated within the oligomerization catalyst mixture for a time sufficient to affect the desired change. The time at which the modifier is added during the catalyst preparation step does not appear critical. Preferably, it is added to the polymerization diluent prior to addition of the catalyst components and definitely prior to initiation of the ethylene oligomerization reaction. Suitably, the oligomerization catalyst mixture is separately treated with the modifier for a period ranging from about five minutes to about one-half hour. The modifier, or π base compound, can be added to the oligomerization catalyst mixture, or solvent containing the catalyst mixture, to affect the modification in effective concentrations ranging up to about 300 mole percent, based on the moles of transition metal halide. Higher concentrations can be used but are not generally desirable because once modification is effected, the added modifier may be involved in unwanted side reactions, e.g., alkylation, or in some cases actually effect a decrease in the average molecular weight of the product olefins.

The concentration of the modifier utilized in forming the catalyst determines the number average molecular weight ($\overline{M}n$) of the product olefins at a given set of polymerization conditions. Although the extent of the change depends on the effectiveness of the pi base, it has been generally found that $\overline{M}n$ increases with increasing base concentration up to about 300 mole percent based on the transition metal halide used in forming the catalyst complex. The most substantial gains in product $\overline{M}n$ are obtained with base modifier concentration in the range of 50-150 mole percent.

The modified catalyst, contained in a nonpolar solvent or diluent, is contacted with ethylene at pressures sufficient to maintain a molar ratio of ethylene the product olefins sufficient to suppress copolymerization reaction with the oligomer olefins. The ethylene oligomerization reaction is conducted at temperatures ranging from about 0° C. to about 75° C., and preferably from about 20° C. to about 50° C. pursuant to which conditions the normal alpha olefin carbon range of a product can be shifted from one having an average molecular weight ranging from about 70 to about 200 to one ranging from about 200 to about 400 without substantial production of high molecular weight polymers, i.e., molecular weight above about 100,000.

Pi base compounds are those capable of forming delocalized intermolecular coordinate covalent bonds with an electrophilic substance, i.e., an electron acceptor. The electrons, or an electron pair, or pairs, are supplied by a group of atoms as opposed to a single atom. Thus, two or more atoms of a molecular species donate pi electrons to another species to form a delocalized covalent bond and, as with coordinate covalent bonds, the covalent or ionic character of the molecular bonds will vary in strength but the bonding will generally be more covalent than ionic.

Strong pi base aromatic compounds are especially preferred inasmuch as these are most effective in promoting linear alpha olefins falling within the wax range. Substituent groups, attached to a ring of the aromatic compound by replacing hydrogen, generally provide stronger pi bases than the unsubstituted aromatic compound. The pi base aromatic can therefore be substituted or unsubstituted but preferably it is substituted with an atom or group which will introduce a greater number of electrons into the total molecule without producing adverse side reactions and without sterically hindering the aromatic molecule so as to lessen its effectiveness as a pi base. Desirable ring substituents are, for example, groups such as alkyl, aryl, alkaryl, arylalkyl, cycloalkyl, alkoxy and the like. Preferably, the substituent group is one containing from about 1 to not more than about 12 carbon atoms, but more preferably the groups contain from 1 to about 3 carbon atoms because above this carbon number steric hindrance effects generally become significant. Multiple substitution of the nucleus is generally preferred insofar as steric problems are not encountered. Alkyl groups have been found particularly effective as substituents, particularly methyl, ethyl and propyl. In this regard, it is significant that the pi base aromaticity can be correlated to some degree of accuracy by methyl substitution in the benzene ring. For example, it is found that the effectiveness of benzene as a pi base catalyst modifier increases in direct proportion to its ability to form charge transfer complexes, e.g., with iodine monochloride. Unsubstituted benzene has little effect in forming this particular complex, but as methyl substitution is increased, the effectiveness of benzene as a pi base is drastically increased. The effectiveness is also increased as steric hindrance is decreased. The relative strengths of these compounds is shown, e.g., by reference to Table 1.21 (page 114) of The Modern Structural Theory of Organic Chemistry, Lloyd N. Ferguson, copyright 1952, 1963 by Prentice Hall, Inc., of Englewood, N.J. The relative strengths as pi bases are shown in the table below, the higher numerical value assigned to the pi base aromatic compound being based on the ability to form the charge transfer complex with ICl, this high value also representing the higher ability of the aromatic to function effectively as a pi base.

| π-Base aromatic compound: | Relative stabilities of charge transfer complexes with Icl |
|---|---|
| $C_6H_5Me$ | 1.61 |
| 1,2-$C_6H_4Me_2$ | 2.3 |
| 1,4-$C_6H_4Me_2$ | 2.8 |
| 1,3-$C_6H_4Me_2$ | 2.6 |
| 1,3,5-$C_6H_3Me_3$ | 8.5 |
| $C_6HMe_5$ | 11.9 |
| $C_6Me_6$ | 42.0 |

Heterocyclic compounds can also function effectively as pi base catalyst modifiers and therefore substitution of certain elements for nuclear carbon can be innocuous, but can increase the strength of the compound to function as a pi base. For example, the heterocyclic compound thiophene has been found to provide considerably increased effectiveness as contrasted with benzene. Pyridine is also effective. The aromatic or heterocyclic can be mononuclear or polynuclear, or composed of a plurality of fused or nonfused rings. Fused ring aromatics are generally preferred inasmuch as they are stronger pi bases than aromatics with nonfused rings.

In general, the most useful pi base aromatics are those containing from 6 to about 24 carbon atoms, and preferably from about 6 to about 14 carbon atoms in the total molecule.

Exemplary of aromatic pi bases suitable as modifiers are such mononuclear aromatics as toluene, m-xylene, diisopropyl benzene, durene, isodurene, hexamethyl benzene, thiophene, and the like; polynuclear aromatics with fused rings such as naphthalene, 2-methyl naphthalene, 2-ethyl naphthalene, 1-methyl - 7 - isopropyl naphthalene, di-tert-amyl naphthalene, anthracene, 1,2,4-trimethyl anthracene, 9,10-diisobutyl anthracene, benzothiophene, dibenzothiophene, and the like; and such nonfused polynuclear aromatics as diphenyl, p-terphenyl, diphenyl methane, triphenyl methane, tetraphenyl methane, p-quaterphenyl, 1,3,5-triphenyl benzene, and the like.

The mechanism of the modification is not fully understood, but it is apparent that the modifier complexes with, or solvates, the cationic portion of the catalyst complex as represented by the formula below.

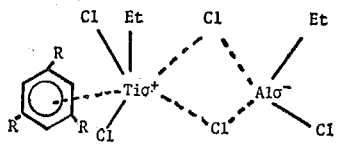

In the formula, the alkyl, R, substituted benzene represents a pi base, the R groups being represented as substituents which increase the pi base aromaticity of benzene by supplying electrons for the total molecule. Applicants, however, do not desire to be bound by a specific theory, but whatever the mechanism there is a definite response of the original catalyst to the modifier addition manifested by an increase in the number average molecular weight of the product olefin and by increased catalyst stability.

The unmodified catalyst employed in the reaction system is a complex reaction product which is substantially soluble in the polymerization system. The complex is obtained by partially reacting a reducible, heavy transition metal halide, the metallic portion of which is selected from Groups IV-B, VI-B, and VIII, of the Periodic Chart of the Elements, with an aluminum alkyl halide compound such that the ultimate formula of the aluminum alkyl compound is $AlR_nX_{3-n}$, wherein $n$ is less than 2 and preferably less than 1, R is alkyl, cycloalkyl or aralkyl, preferably containing from 1 to about 20 carbon atoms, for example, methyl, ethyl, isobutyl, cyclohexyl, benzyl, etc., and X is chlorine, bromine or iodine. The preferred transition metal used in forming the complex is a titanium compound having a valency of 4, as represented by the formula: $TiX_aA_b$, wherein $a=3$ or 4, $b=0$ or 1, and $a+b=4$, X=chlorine or bromine and A is chorine, bromine or an anion derived from a protonic compound such as an alcohol (R'OH) or a carboxylic acid (R'COOH). The R' of the protonic compound can be an alkyl, aryl, aralkyl or cycloalkyl group. The $TiX_aA_b$ component can be made in situ by reacting $TiX_4$ with the protonic compound. Thus the preferred transition metal component of this invention may be selected from the groups $TiX_4$, $TiX_3OR$ and $TiX_3OOCR'$. Typical examples of such compounds are $TiCl_4$ $TiBr_4$, $TiX_3OC_2H_5$ and $TiX_3OOCH_3$.

The aluminum alkyl halide component is generally of the formula $RAlX_2$ or, in some cases, a mixture of components $RAlX_2$ and $R'R''AlX$ wherein R, R' and R'' are similar or dissimilar and thus represent a hydrocarbon radical such as alkyl, cycloalkyl or aralkyl containing, preferably, from 1 to about 20 carbon atoms, and X is a halogen such as chlorine, bromine or iodine.

The molar ratio of alkyl aluminum halide to the transition metal halide in forming the complex is not critical to this invention as long as the $AlR_nX_{3-n}$ reaction product has the proper formula. The ratio can be 0.1/1 to 150/1 or more. Catalyst concentration is normally in the range of 0.1 to 10 grams per liter of diluent.

Ethylene is unique in the instant invention in that other olefins do not respond to give linear alpha olefins. Therefore, it is desirable to use essentially pure ethylene or mixtures of ethylene with inert gases as the feed for the process of this invention. Ethylene feeds containing minor amounts of other olefins can be used but it must be realized that the copolymerization will, to some extent, decrease product linearity.

The polymerization diluent is a very important feature of this invention. Non-polar diluents are preferred, inasmuch as polar solvents undesirably decrease the average molecular weight of the product. Aliphatic and naphthenic diluents are quite satisfactory, and are preferred. Moreover, liquid ethylene can be used as a solvent. This offers the advantage, in commercial processes, of eliminating the need for solvent recovery systems.

Illustrative of the useful aliphatic solvents are hexane, 2,3-dimethyl butane, 2-methyl-3-ethyl hexane, hexadecane, nonadecan, heptadecane, and industrial mixtures such as kerosene, light naphthas and the like. Suitable naphthenes are cyclohexane, cyclopentane, butylcyclopentane, 1,4-diethylcyclohexane, and the like.

The oligomerization reaction must be conducted at sufficient pressure to avoid the formation of highly branched olefins and to obtain linear olefins in high selectivities. Although some variations in pressure are permitted, depending upon the catalyst composition, diluent and temperature, the pressure should be maintained above about 100 p.s.i.g. in order to produce commercially attractive yields (at least above 5 weight percent and preferably above 10 weight percent olefins in the reactor effluent) or linear alpha olefins having a purity greater than about 90 percent. Pressures can range as high as 1000 p.s.i.g., and higher, but at very high ethylene pressures the process may become uneconomical because of the equipment requirements and ethylene recycle. Preferably, the pressure ranges from about 200 p.s.i.g. to about 600 p.s.i.g. of ethylene pressure.

The ratio of moles of ethylene to the moles of products must be above about 0.8 in order to effect the selective synthesis of ethylene to linear olefins. The preferred molar ratio of ethylene to products is above about 5.0. The upper limit of the mole ratio of ethylene to product must be above 0.8 or the product formed contains more than 10 percent branched chain olefins at product concentrations required to obtain commercially attractive yields.

The process of this invention is carried out at selected conditions of temperature and pressure which will convert the ethylene to olefin product. Temperature selection permits some control of the average molecular weight of the product. Preferably, the reaction can be carried out at temperatures below about 75° C., but more preferably it is carried out at between about 20° C. and about 50° C.

Reaction times are not particularly critical when operating under the preferred conditions and they will normally be in the range of 0.1 to 5 hours to obtain product concentrations greater than 5 percent by weight in the diluent. The process can be carried out in batch or continuous operation. However, high product purity and high concentration are achieved most easily in batch reactions or in continuous systems operating under essentially plug flow.

The oligomerization reaction is not generally carried to completion, but quenched to terminate the reaction at an optimum desired time. After the catalyst has been effectively quenched, e.g., by adding isopropyl alcohol, the residues can be removed from the products in any conventional way, such as washing with water or aqueous caustic, adsorption, ion exchange resins, and the like.

The following demonstrations, and illustrative examples, bring out the more salient features of the invention.

EXAMPLES

The following is illustrative of the experimental procedure used in preparing and modifying the catalysts for individual ethylene oligomerization runs.

Catalyst preparation

Approximately 400 ml. of n-heptane (percolated over a 4 A. molecular sieve) is charged to a dry 500 ml. flask equipped with a small side arm, a serum cap, and an adapter to permit charging to an autoclave. A pi base, concentration noted in the table below, is injected or added into the heptane followed by addition of 0.66 ml. (6 millimoles) of $TiCl_4$. The mixture is then treated with a mixture of aluminum alkyl halides, 20 weight percent in heptane which furnishes 2 millimoles of $AlEtCl_2$ and 1 millimole $AlEt_2Cl$.

The flask containing the catalyst solution, with added modifier, is then wrapped in aluminum foil, and the contents held at 25° C. for 5–6 minutes. The flask is then weighed and the contents thereof pressured into a 2-liter Parr autoclave. Weighing the catalyst flask after charging permits an accurate determination of the weight of catalyst solution charged to the autoclave. Approximately 270–275 g. of the catalyst, the appearance of which is noted in the table below, is charged to the autoclave.

The control is prepared in similar manner except that the modifier addition step is omitted from the procedure.

Oligomerization

The oligomerization reactions are carried out in a 2-liter Parr autoclave. The contents of the autoclave are precooled to 0° C. prior to charging the catalyst solution. After the catalyst is added, ethylene (dry and oxygen-free) is pressured into the autoclave. The pressure in the autoclave is maintained at 550–600 pounds by adding ethylene as needed. The temperature rises quite rapidly to around 20° C. and is maintained at this temperature for one hour.

A run is terminated by pressuring in 9 grams of isopropanol while the reactor is still under reaction conditions (20° C., 550–600 p.s.i.g. ethylene pressure). The quenched product is stirred for approximately 5 minutes and the unreacted ethylene vented off through a Dry Ice trap and wet test meter. After all the ethylene has been vented, the autoclave is weighed prior to disassembly to obtain a yield figure. The autoclave is then disassembled and the total product removed. A sample of the product is analyzed on a G.C. column to obtain product distribution data. The yield of liquid olefins is given in the tabulation below.

Product workup

The alcohol quenched product is water-washed using two 500 ml. portions of deionized water. After separating off the water, the amount of high molecular weight polyethylene, insoluble in heptane at 90° C., is determined by filtration, air drying and finally drying for 1 hour in a vacuum oven at 125° C. and 26″ Hg vacuum. The filtered liquid product (heptane plus ethylene oligomers) is dried and analyzed using capillary G.C. techniques. Product linearity (weight percent linear alpha olefins in $C_{12}$–$C_{20}$ fraction) is determined, and in all instances was found to range 98+. The product average molecular weight ($\overline{M}n$) of the olefins is determined from the product distribution obtained by gas chromatography.

EXAMPLES 1–8

The foregoing procedure is used in preparing a control and a series of eight additional runs with modified catalysts. These data, given in Table I below, show the effect of pi bases in increasing the number average molecular weight of the product olefins when used in a nonpolar diluent.

TABLE I

[Catalyst: 6 $TiCl_4$/2 $AlEtCl_2$/1 $AlEt_2Cl$]

| Pi base additive (Mole percent on $TiCl_4$) | Activity, g. prod./g. alkyl/hr. | Product $\overline{M}n$ | Insol. polymer yield, wt. percent on total |
|---|---|---|---|
| None | 80 | 181 | 13.0 |
| Benzene (800) | 120 | 167 | 3.0 |
| Xylene (800) | 163 | 187 | 3.2 |
| Naphthalene (160) | 185 | 196 | 7.1 |
| Anthracene (160) | 193 | 212 | 7.0 |
| Mesitylene (160) | 145 | 212 | 7.8 |
| Isodurene (160) | 110 | 220 | 7.6 |
| Hexamethyl benzene (160)[1] | (28) | 600 | 19.0 |
| Thiophene (160) | 100 | 207 | 7.9 |

[1] (Catalyst precipitates. Accurate measure of activity impossible.)

The data show that olefin product $\overline{M}n$ increases with increasing basicity of the additive (heptane diluent) and that the more desired 200+ $\overline{M}n$ wax olefin products can be obtained at reasonable catalyst activity.

Diluent polarity has heretofore been known as a variable which exerts an influence upon the product number average molecular weight, $\overline{M}n$, and that as the selected diluent becomes less polar, other conditions being held constant, $\overline{M}n$ increases. It is also known that increasing temperature will favor increasing $\overline{M}n$.

The problems and limitations of wax olefin synthesis with unmodified oligomerization catalysts, however, even under the most favorable conditions, are illustrated in the following data presented in Table II below. The various runs were made according to procedures outlined preceding Table I. Changes in catalyst composition are noted in the table.

TABLE II.—SYNTHESIS OF WAX RANGE OLEFINS (Without catalyst modification)

(A) Effect of diluent polarity on product number average molecular weight ($\overline{M}n$).
Catalyst comp. (moles): $TiCl_4$+6 $AlEtCl_2$.
Cat. conc. in diluent: Approx. 0.02 M.
Polymerization at: 35° C. and 650 p.s.i.g. ethylene.

| Diluent | Product $\overline{M}n$ |
|---|---|
| Chlorobenzene | 108 |
| Xylene | 123 |
| Heptane | 187 |

(B) Effect of polymerization temperature on $\overline{M}n$.
Catalyst comp. (moles): $TiCl_4$+6 $AlEtCl_2$.
Cat. conc. in diluent: Approx. 0.02 M.
Polymerization: Heptane diluent, 650–760 p.s.i.g. $C_2H_4$.

| Polymerization, temp., ° C. | Product $\overline{M}n$ | Insoluble polyethylene yield, wt. percent of total |
|---|---|---|
| 20 | 173 | 0 |
| 35 | 187 | <1 |
| 50 | 223 | 13 |

The data clearly show that polymerization in a nonpolar diluent is effective to some degree, even without catalyst modification, in increasing the $\overline{M}n$ of the olefin products and that elevating the polymerization temperature further increases product $\overline{M}n$. Thus, it is possible to obtain an $\overline{M}n$ ranging up to about 200, but it is impractical to produce a higher $\overline{M}n$ by this method. The mere expediency of elevating temperature, however, is impractical in that it results in the formation of increasing amounts of unwanted high molecular weight polyethylene.

A process which yields oligomer olefin products with $\overline{M}n$ less than 200 is totally unacceptable for wax olefin synthesis in that greater than half of the olefin product is below the $C_{22+}$ wax olefin range. Products with $\overline{M}n$ values in the 250–300 range, preferably above 300, are desirable in that most of the product is comprised of olefins in the wax range, and in particular, contain large percentages of the valuable, high melting $C_{40}$–$C_{100+}$ olefin waxes.

The following examples show the effect of diluent polarity on the aromatic base modified catalyst. Thus, in accordance with the general procedures outlined preceding Table I, a hexamethylbenzene modified catalyst is evaluated in diluents of different polarity. Results are summarized in Table III below.

EXAMPLES 9–11

TABLE III

Catalyst composition (moles): 6 $TiCl_4$+2 $AlEtCl_2$+1 $AlEt_2Cl$.
Additive (moles): 10 hexamethylbenzene.
Catalyst conc. in diluent: ~0.025 M.
Polymerization conditions: 20° C., 550 p.s.i.g. $C_2H_4$.

| Example No. | Diluent composition (volume percent) | Activity, g. prod./g. alkyl/hr. | Product $\overline{M}n$ | Insol. polym. yield, wt. percent on total |
|---|---|---|---|---|
| 9 | Heptane (100) | 28 | 600 | 19 |
| 10 | Benzene (10) / Heptane (90) | 48 | 292 | 10 |

The above data clearly show that activity improves going from nonpolar heptane to the polarizable benzene diluent. However, as will be observed, there is an appreciable drop in the olefin product number average molecular weight.

The need for product $\overline{M}n$ values of 200+ for a wax olefin process will be appreciated in view of the following correlations between product $\overline{M}n$ and wax olefin yields.

TABLE IV

| Product $\overline{M}n$ | 108 | 203 | 243 | 303 | 438 |
|---|---|---|---|---|---|
| Wt. percent wax range ($C_{22+}$ $C_{100+}$) olefins in product | 6.9 | 46.6 | 58.2 | 70.4 | 83.1 |

It is thus quite apparent that the use of a non-polar diluent, with a modified catalyst, is quite helpful in greatly elevating the product $\overline{M}n$. This is so even though a non-polar solvent per se, with an unmodified catalyst, fails to provide attractive yields of wax range olefins, even under the most favorable process conditions.

The following example shows the effect of modifier concentration on catalyst performance. Thus, in accordance with the general procedures outlined preceding Table I, various concentrations of hexamethylbenzene are employed to modify a catalyst. The results are tabulated in Table V below.

TABLE V.—CATALYST MODIFIER IN HEPTANE DILUENT

Catalyst composition (moles): 1 $TiCl_4$ + 6 $AlEtCl_2$.
Additive: Hexamethylbenzene (conc. noted in table).
Catalyst conc. in heptane: ~0.02 M.
Polymerization conditions: 35° C., 650–700 p.s.i.g. $C_2H_4$.

| Mole percent hexa-methylbenzene on $TiCl_4$ | Activity, g. prod./g. $TiCl_4$/hr. | Product $\overline{M}n$ | Wt. percent polyethylene in product |
|---|---|---|---|
| 0 | 176 | 187 | <1 |
| 33 | 167 | 270 | <1 |
| 67 | 100 | 340 | 4.0 |
| 100 | 67 | 400 | 2.0 |
| 200 | 5 | 460 | 7.0 |

It is thus clearly shown that increasing the modifier concentration of strong bases increases the product $\overline{M}n$ significantly in the 10 to 100 mole percent on $TiCl_4$ range. Higher concentrations can be used, but generally at higher concentrations, and particularly above about 300 mole percent catalyst deactivation can result.

The weaker pi bases, however, do not necessarily produce this result. Increasing concentrations of the weaker aromatic pi bases, e.g., m-xylene or mesitylene, even when used above the 100 mole percent range, do not deactivate the catalyst; rather, on the contrary, activity increases as the system approaches the mixed diluent situation. Product $\overline{M}n$, however, decreases. The data in Table VI below are illustrative.

TABLE VI.—CATALYST MODIFIER IN HEPTANE DILUENT
(Mesitylene modifier)

Catalyst composition (moles): 6 $TiCl_4$, 1 $AlEt_2Cl$, 2 $AlEtCl_2$.
Catalyst conc. in diluent: 0.025 M.
Polymerization conditions: 20° C., 550 p.s.i.g. $C_2H_4$.

| Mole percent mesitylene on $TiCl_4$ | Activity, g. prod./g. alkyl/hr. | Product $\overline{M}n$ |
|---|---|---|
| 0 | 80 | 181 |
| 80 | 101 | 200 |
| 160 | 145 | 212 |
| 300 | 192 | 190 |

It is apparent that various modifications and changes can be made without departing the spirit and scope of the invention. Changes in various conditions can effect, e.g., product $\overline{M}n$. For example, it would appear that a product $\overline{M}n$ of about 200 or perhaps even 223 represents within a few points the optimum product $\overline{M}n$ attainable with unmodified catalyst systems. Variations in the catalyst Ti/Al ratio, the use of mixed aluminum alkyl halides, e.g., $Al_3Et_4Cl_5$, the use of higher or lower temperatures or higher or lower pressures of ethylene have all failed to produce the desired product average molecular weights.

EXAMPLE 12

That the pi base modifiers serve to stabilize the oligomerization catalyst in addition to influencing the catalytic formation of olefin waxes is illustrated by the data in Table VII below. Experimental procedures followed the general example preceding Table I. Changes made in catalyst composition, polymerization diluent and polymerization conditions are noted in the table.

TABLE VII.—PI BASE MODIFIER EFFECT ON CATALYST STABILITY (A) Effect of hexamethylbenzene on catalyst stability in heptane diluent.

Catalyst composition (moles): $TiCl_4$ + 6 $AlEtCl_2$.
Catalyst conc. in diluent: Approx. 0.02 M.
Polymerization at: 50° C. and 800 p.s.i.g.

| Mole percent hexamethyl-benzene on $TiCl_4$ | Wt. percent high molecular weight polyethylene in product |
|---|---|
| 0 | 13.0 |
| 100 | 3.5 |

(B) Effect of various aromatic bases on catalyst stability in xylene diluent.

Catalyst comp. (millimoles): $TiCl_4$/$AlEtCl_2$/$AlEt_2Cl$ 1/1/.4.
Polymerization at: 2° C., 500 p.s.i.g. ethylene.

| Modifier | Millimoles added | Wt. percent polyethylene in product |
|---|---|---|
| None | | 11.0 |
| Mesitylene | 37 | 1.1 |
| Durene | 20 | 2.7 |

Thus it is seen that catalyst stability (i.e., no decomposition to the conventional Ziegler catalyst which yields high molecular weight polyethylene) is greatly enhanced by the presence of the basic aromatic additives.

The modified catalyst, moreover, provides a means of controlling the product's average molecular weight. It is unique, and even enhances existing methods of altering product characteristics.

Having described the invention, what is claimed is:

1. A process for preparing wax range linear alpha olefins comprising
   polymerizing ethylene, in the presence of a diluent selected from the group consisting of nonpolar aliphatic and naphthenic diluents and liquid ethylene,
   at a temperature and pressure sufficient to oligomerize the ethylene while suppressing copolymerization reactions, said temperature ranging below about 75° C.,
   by contact with an aromatic pi base modified ethylene oligomerization catalyst comprising the reaction product mixture of components including
   a titanium halide selected from the group consisting of $TiX_4$, $TiX_3OR'$, $TiX_3OOCR'$, wherein X is selected from the group consisting of chlorine and bromine and R' is selected from the group consisting of alkyl, aryl, aralkyl, and cycloalkyl;
   an aluminum alkyl halide compound such that the ultimate formula of the aluminum alkyl compound after reaction with the titanium halide is $AlR_nX_{3-n}$, wherein R is selected from the group consisting of alkyl, aralkyl and cycloalkyl, X is selected from the group consisting of chlorine, bromine and iodine, and $n$ is less than 2, and
   an aromatic pi base compound, said aromatic pi base compound being selected from the group consisting of aromatic hydrocarbon modifiers having a basicity greater than xylene,
   the aromatic pi base compound being sufficient to increase the number average molecular weight of the product olefins over and above that attributable to the use of the unmodified catalyst at otherwise identical conditions.

2. The process of claim 1 wherein the modifier is added to the other catalyst components in concentration ranging up to about 300 mole percent, based on the moles of titanium metal halide present in the mixture.

3. The process of claim 2 wherein the modifier is added in concentration ranging from about 50 to about 150 percent.

4. The process of claim 1 wherein the modifier is characterized as an aromatic hydrocarbon containing ring substituents selected from the group consisting of alkyl substituents having from 1 to about 12 carbon atoms, these substituents being capable of introducing a greater number of pi electrons into the total molecule without sterically hindering the aromatic molecule so as to lessen its effect as a pi base.

5. The process of claim 4 wherein the modifier is an aromatic hydrocarbon containing alkyl substituents having from 1 to about 3 carbon atoms.

6. The process of claim 5 wherein the substituents are selected from the methyl, ethyl and propyl.

7. The process of claim 1 wherein the temperature of the reaction ranges from about 20° C. to about 50° C., and pressures range from above about 100 p.s.i.g. to about 1000 p.s.i.g.

8. The process of claim 1 wherein said aromatic pi base compound is selected from the group consisting of naphthalene, anthracene, mesitylene, isodurene and hexamethylbenzene.

9. The process of claim 1 wherein said titanium metal halide is $TiCl_4$, said aluminum alkyl halide compound is $AlEtCl_2$ and said catalyst modifier is hexamethylbenzene.

10. A process for preparing $C_{22}$–$C_{200}$ linear alpha olefins comprising polymerizing ethylene in the presence of a nonpolar diluent, at temperatures in the range of from about 0° to 50° C. and pressures ranging from about 200 to 600 p.s.i.g. of ethylene by contacting with an aromatic pi base modified ethylene oligomerization catalyst comprising an alkylaluminum halide-$TiCl_4$ reaction complex having the formula $AlR_nX_{3-n}$ wherein R is selected from the group consisting of alkyl, aralkyl and cycloalkyl, X is selected from the group consisting of chlorine, bromine and iodine and $n$ is less than 2, and an aromatic pi base compound, said aromatic pi base compound being selected from the group consisting of aromatic hydrocarbon modifiers having a basicity greater than that of xylene, which effectively increases the number average molecular weight of the product olefins over and above that attributable to the use of the unmodified catalyst at otherwise identical conditions.

11. The process of claim 10 wherein said aromatic pi base compound is selected from the group consisting of naphthalene, anthracene, mesitylene, isodurene and hexamethylbenzene.

12. The process of claim 10 wherein the nonpolar diluent is selected from the group consisting of heptane, hexane, cyclohexane and liquid ethylene.

References Cited

UNITED STATES PATENTS

| | | | |
|---|---|---|---|
| 3,116,274 | 12/1963 | Boehm et al. | 260—94.9 |
| 3,485,881 | 12/1969 | Zuech | 260—666 |
| 3,108,145 | 10/1963 | Antonsen | 260—683.15 |
| 3,441,630 | 4/1969 | Langer et al. | 260—683.15 |
| 3,472,910 | 10/1969 | Favis | 260—683.15 |
| 3,474,157 | 10/1969 | White et al. | 260—683.15 |

PAUL M. COUGHLAN, JR., Primary Examiner

U.S. Cl. X.R.

252—429 B; 260—94.9 C, 94.9 CC